Patented Feb. 9, 1926.

1,571,982

UNITED STATES PATENT OFFICE.

MARK WALKER, OF LOS ANGELES, CALIFORNIA, ASSIGNOR TO THE PACIFIC R. & H. CHEMICAL CORPORATION, OF EL MONTE, CALIFORNIA, A CORPORATION OF CALIFORNIA.

PURIFICATION OF HYDROCYANIC ACID.

No Drawing.    Application filed October 26, 1925.   Serial No. 65,037.

*To all whom it may concern:*

Be it known that I, MARK WALKER, a citizen of the United States, and resident of Los Angeles, in the county of Los Angeles and State of California, have invented certain new and useful Improvements for the Purification of Hydrocyanic Acid, of which the following is a specification.

This invention pertains to the purification of liquid hydrocyanic acid, particularly to products ranging from 96% to 100% purity such as is used as a commercial fumigant. The object of the invention is to produce a product substantially free of hydrogen sulphide.

Liquid hydrocyanic acid is used in large quantities as a commercial fumigant, particularly for the control of pests on citrus trees. The commercial product usually contains 96 or more percent of hydrocyanic acid and the only other constituents besides water are small amounts of stabilizing compounds such as sulphuric acid. Most of the hydrocyanic acid used is made from metallic cyanides that contain metallic sulphides. The chemical conditions that produce the hydrocyanic acid from the metallic salts usually liberate hydrogen sulphide as well. The hydrogen sulphide is an objectionable impurity for two important reasons. The first reason is that it has a deleterious action upon equipment used for its distribution and the second reason is that hydrogen sulphide has a tendency to cause decomposition and polymerization of the liquid hydrocyanic acid when it is in storage.

To understand the first reason it is necessary to understand the types of equipment that are used for its distribution. These are portable pumps combined with tanks holding from one to several gallons of liquid hydrocyanic acid. The pumps are so made that they can measure quantities of liquid in amounts from approximately 20 c. c. up to 300 c. c. or more with an error of not more than + or —3%. Not only must they be capable of measurement with this accuracy but they must be so constructed that operators can treat a tented tree in not more than 80 seconds. This work is done at night and therefore in the darkness. The hydrocyanic acid is a very volatile and exceptionally poisonous liquid. The pumps used for its distribution must therefore be remarkably simple in construction and so sturdily built that operating characteristics will be retained in spite of hard usage and the darkness in which they are used. Whenever hydrogen sulphide is present in the liquid hydrocyanic acid, corrosion of containers and pump parts is sufficient to seriously detract from their value. Not only do the pumps become more difficult to operate but they become less accurate as corrosion proceeds.

The second objection to hydrogen sulphide in liquid hydrocyanic acid is its tendency to cause the liquid to polymerize. Hydrocyanic acid is a compound that polymerizes readily with an exothermic reaction, accompanied to a slight extent at least by chemical decomposition. Polymerized hydrocyanic acid is a solid of about the physical consistency and appearance of finely ground charcoal. It has no lubricating properties whatever, is exceptionally insoluble in practically all chemical reagents and is exceedingly objectionable in equipment for storage and dispensing of liquid hydrocyanic acid. We have learned that hydrogen sulphide is one of the substances that tends to produce polymerization of liquid hydrocyanic acid. Its action to be sure is not as marked as that of alkaline substances such as alkaline metal carbonates, hydrogen oxides and ammonia. Inasmuch as hydrogen sulphide does have a slight tendency to accelerate polymerization, its presence in commercial hydrocyanic acid is therefore undesirable.

Hydrogen sulphide dissolves in liquid hydrocyanic acid. By the process disclosed in U. S. Patent No. 1,444,300 to Brown the hydrogen sulphide content of liquid hydrocyanic acid can be reduced to about 0.05 volume dissolved in one volume of the liquid hydrocyanic acid. On long standing this hydrogen sulphide will gradually disappear and after several months there may indeed be no more than a trace of hydrogen sulphide left. This method of elimination is too slow, however, for commercial requirements. I therefore sought means of removing the hydrogen sulphide by chemical means. The ideal reagent for the removal of hydrogen sulphide in liquid hydrocyanic acid is one which is soluble in liquid hydrocyanic acid in all proportions; it must work rapidly; it must remove the hydrogen sulphide completely; it must not be corrosive to metals used for making drums and other appliances; it must produce no objectionable precipitate in the liquid; it must leave no dissolved solid; it must be convenient to use and inexpensive. I have found that for practical purposes all of these requirements are met by sulphur dioxide which is preferably introduced as a liquid.

My preferred method for removal of hydrogen sulphide from liquid hydrocyanic acid is to first remove all of the hydrogen sulphide possible by the process disclosed in Patent No. 1,444,300 indicated above. Thereafter I introduce a sufficient amount of liquid sulphur dioxide or pure gaseous sulphur dioxide to completely react with the hydrogen sulphide present. I cannot state positively the mechanism of this chemical reaction but apparently some, if not all, of the sulphur is thrown out as a very fine precipitate. This precipitate is of such a nature and so small in amount that it is not objectionable.

It is obvious that sulphur dioxide can be introduced as a water solution and I do not therefore distinguish in principle between the use of liquid sulphur dioxide, gaseous sulphur dioxide, and sulphur dioxide in solution.

What I claim is:

1. The process of purifying liquid hydrocyanic acid containing hydrogen sulphide consisting in reacting the hydrogen sulphide with sulphur dioxide.

2. The process of purifying liquid hydrocyanic acid containing hydrogen sulphide consisting in adding thereto liquid sulphur dioxide.

3. The process of purifying liquid hydrocyanic acid containing hydrogen sulphide consisting in heating the liquid within 10° C. of its boiling point, agitating the heated liquid, separating the liquid from the evolved gaseous impurities and treating the heated liquid with sufficient sulphur dioxide to completely react with the hydrogen sulphide remaining.

4. The process of purifying liquid hydrocyanic acid containing hydrogen sulphide consisting in heating the liquid to within 10° C. of its boiling point, separating the liquid from the evolved hydrogen sulphide and treating the separated liquid with sufficient sulphur dioxide to react with the remaining hydrogen sulphide.

5. The process of purifying liquid hydrocyanic acid containing hydrogen sulphide consisting in heating the liquid to within 10° C. of its boiling point, separating the liquid from the evolved hydrogen sulphide and treating the separated liquid with sufficient liquid sulphur dioxide to react with the remaining hydrogen sulphide.

Signed at El Monte, in the county of Los Angeles and State of California this 13th day of October A. D. 1925.

MARK WALKER.